United States Patent [19]

Hibino et al.

[11] 4,104,493

[45] Aug. 8, 1978

[54] SWITCH FOR DETECTING COLLISION OF VEHICLE

[75] Inventors: Yoshihiro Hibino; Hideaki Sasaya, both of Okazaki; Akihiro Kobayashi, Aichi, all of Japan

[73] Assignee: Nippon Soken, Inc., Nishio, Japan

[21] Appl. No.: 738,756

[22] Filed: Nov. 4, 1976

[30] Foreign Application Priority Data

Dec. 15, 1975 [JP] Japan .......................... 50-169631[U]

[51] Int. Cl.² ............................................. H01H 35/14
[52] U.S. Cl. ............................ 200/61.45 R; 200/61.48
[58] Field of Search ............... 200/61.45 R, 61.45 M, 200/61.46, 61.48, 61.51, 277, DIG. 45, 61.52

[56] References Cited

U.S. PATENT DOCUMENTS

| 2,710,578 | 6/1955 | Rabinow | 200/61.45 R X |
| 2,966,564 | 12/1960 | Cunningham | 200/61.46 |
| 3,859,488 | 1/1975 | Jones | 200/277 X |
| 4,022,997 | 5/1977 | Inagaki et al. | 200/61.45 R |

*Primary Examiner*—James R. Scott
*Attorney, Agent, or Firm*—Cushman, Darby & Cushman

[57] ABSTRACT

An apparatus for detecting the collision of a vehicle to produce a signal indicating the collision, which signal is adapted to actuate a safety device, such an apparatus having a pair of rotatable rigid members defining therebetween a space in which disposed is a stationary contact adapted to cooperate with a movable contact carried by the rigid members. Spring means are provided for biasing the rigid members in one rotational direction against a rotational force caused by deceleration of the vehicle. The rigid members are provided with a massive weight so as to make the gravitational center eccentric from the rotational axis thereof, thereby an enhanced sensitivity to the deceleration is obtained.

4 Claims, 6 Drawing Figures

U.S. Patent  Aug. 1, 1978  Sheet 2 of 2  4,104,493
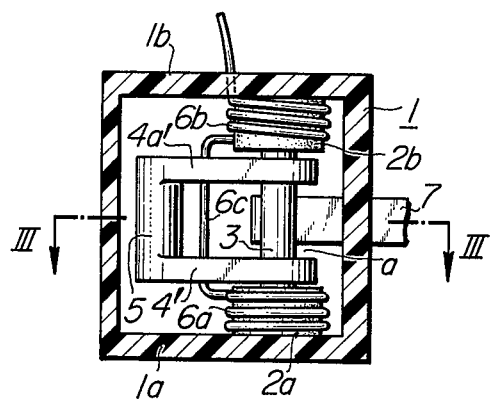
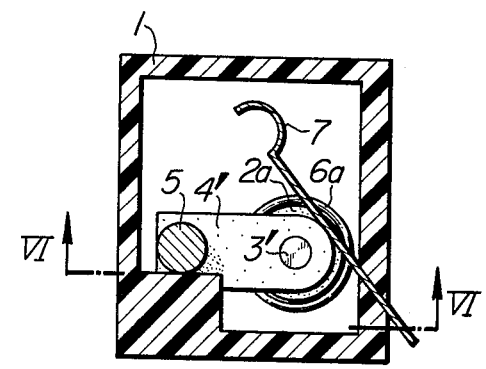
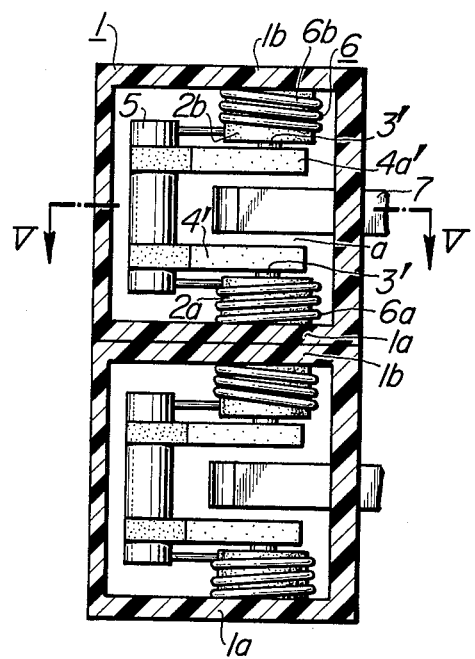

4,104,493

SWITCH FOR DETECTING COLLISION OF VEHICLE

BACKGROUND OF THE INVENTION

The present invention relates to an apparatus, mounted on a vehicle, for detecting collision of a vehicle and, more particularly, to an apparatus, which operates in response to deceleration caused by the collision, and generates a signal to actuate a protecting device such as an air bag device for protecting passengers.

Hitherto, there have been proposed various collision detecting apparatuses which are provided with means to establish an electrical connection between an electrical source and a protecting device so as to actuate the latter when an emergency such as a collision takes place.

However, these known apparatus are unsatisfactory since they must be large in size in order to ensure a stable production of a signal and, therefore, they are impractical and require further improvement.

SUMMARY OF THE INVENTION

It is, therefore, an object of the invention to provide an improved collision detecting apparatus which is capable of producing a collision signal in a stable manner and less likely to be activated erroneously so as to eliminate the above said disadvantages.

It is another object of the invention to provide a collision detecting apparatus reduced in size and having an enhanced reliability by an adoption of a pair of symmetrical structures between which a stationary contact is disposed.

According to the present invention, there is provided a collision detecting apparatus comprising a pair of rotatable rigid members each having the gravity center eccentric from the rotational axis thereof so as to convert a linear decelerating motion into a rotational motion, and electrical contact members adapted to operate in response to the rotational motion, thereby a collision detecting signal is produced.

DESCRIPTION OF THE DRAWINGS

Other objects and advantageous features of the present invention will be more apparent from the following description of preferred emodiments taken in conjunction with the accompanied drawings in which:

FIGS. 1 and 2 illustrate an embodiment of the present invention in which FIG. 1 is a cross-sectional view taken along the line I—I of FIG. 2, while FIG. 2 is a sectional view taken along the line II—II of FIG. 1.

FIGS. 3 and 4 illustrate another embodiment of the present invention in which FIG. 3 is a cross-sectional view taken along the line III—III of FIG. 4, while FIG. 4 is a sectional view taken along the line IV—IV of FIG. 3.

FIGS. 5 and 6 illustrate a further embodiment of the present invention in which FIG. 5 is a cross-sectional view taken along the line V—V of FIG. 6, while FIG. 6 is a sectional view taken along the line VI—VI of FIG. 5.

DESCRIPTION OF PREFERRED EMBODIMENT

Figure 1:
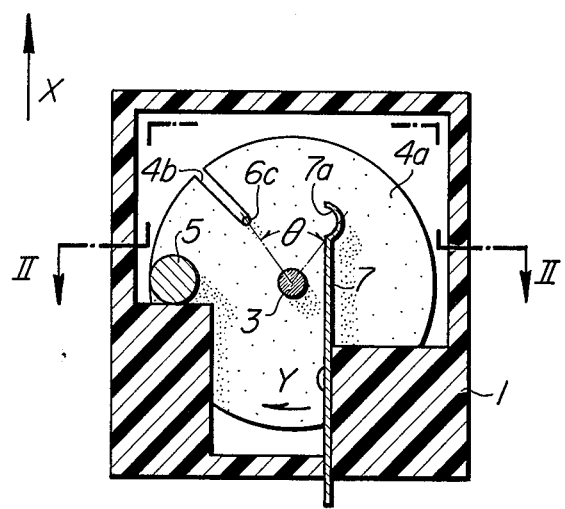
Figure 2:
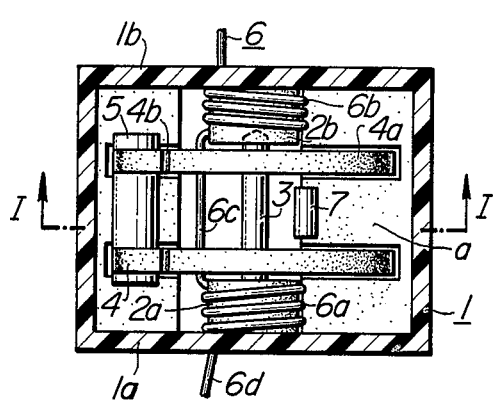

Referring at first to FIGS. 1 and 2 which in combination show an embodiment of the invention, a boxlike case 1 is made of an electrically insulating material such as resins, and has two mutually opposing side walls 1a, 1b each of which carrying a bearing 2a, 2b made of TEFLON or DERLYN (Trademarks). A shaft 3 made of iron has both ends tapered and rotatably supported by the bearings 2a, 2b. To the shaft 3, is secured a rigid disk 4 extending in a plane perpendicular to the axis of the shaft 3. Thus, the the disk 4 is rotatable in relation to the case 1, and is connected to an identical disk 4a spaced at a predetermined distance from the disk 4 by means of a massive weight 5. The disks 4 and 4a are made of an electrically insulating material. A stationary contact 7 consisting of a resilient leaf spring made of an electrically conductive material projects into a spare a defined by the disks 4, 4a. The stationary contact 7 is fixed at its one end to the case 1.

The massive weight 5 is made of aluminum brass or a like material and has a cylindrical shape. An electrically conductive coiled spring 6 consisting of coiled ends 6a, 6b is bridged with a straight intermediate portion 6c. Both coiled ends 6a, 6b of the spring 6 are fixed to guide portions of the case 1, while the straight intermediate portion 6c is received into slits or grooves 4b formed in the disk assembly 4, 4a. Thus, the coiled spring 6 imparts a preload to the disks 4, 4a for ensuring that the latter are not rotated by a deceleration force smaller than a predetermined value. A terminal 6d is secured to one of the coiled ends of the spring 6, for example a coiled end 6a, so that the conductive spring 6 acts as a movable contact at its straight portion 6c. The straight portion 6c of the spring 6 is so positioned that a recess 7a of the stationary contact constituted by the leaf spring 7, will receive it. Therefore the straight portion 6c and the leaf spring 7 cooperate to serve as electrical contact means.

Referring to FIG. 1, the positional relationships of the massive weight 5, the straight portion 6c of the spring 6 and the leaf spring 7 are such that, in the normal condition, the straight portion 6c received in the slits or the grooves of the pair of disks and biases the latter against the rotation. The leaf spring 7 constituting the stationary contact is arranged in an angular position from the straight portion 6c of the spring 6 in the clockwise direction, while the massive weight 5 is secured to the disks 4, 4a at their respective portions suitable to respond to deceleration in the direction opposite to the direction X of the movement of the vehicle. Thus, the assembly consisting of the disks 4, 4a and the massive weight 5 has its center of gravity eccentric from the rotational axis of the shaft 3 for allowing the rotation of the disks 4, 4a, so as to exhibit an enhanced sensitivity to the deceleration.

The terminals 6d of the coiled spring 6 and the leaf spring 7 are connected with lead wires to a detonator of an air bag means and to a battery source, respectively, which are not shown in the drawings. In use, the collision detecting apparatus of this embodiment is mounted on a vehicle at such a position most sensitive to the deceleration caused by the collision and suitably close to a front bumper in such a manner that the arrow X of FIG. 1 coincides with the direction of movement of the vehicle.

In operation, as a collision takes place, the resultant deceleration force causes the pair of disks and the massive weight 5 having the center of gravity eccentric from the rotational axis to rotate in the direction of an arrow Y of FIG. 1. When the collision takes place at a high speed of the vehicle and the deceleration is accordingly high, and when the rotational force caused thereby is large enough to overcome the biasing force of the coil spring 6, the rotational force brings the disks 4, 4a to rotate by an angle greater than the predetermined angle θ. Consequently, the disks 4, 4a deflect the coiled spring 6 so as to move the straight portion 6c of the coiled spring 6 in contact with the leaf spring 7. Consequently a circuit generating a stable electrical collision signal is established so as to result in the explosion of the detonator to inflate the air bag.

It will be understood by those skilled in the art that such a deceleration caused by an abrupt braking or an extremely bad road condition is too low to cause the rotation of the disks 4, 4a over the predetermined angle θ. The rotational movement resulting from such deceleration soon ceases, due to the biasing force exerted by the coiled spring 6, so that the electrical circuit is never established, which conveniently avoids an erroneous inflation of the air bag at the time of, for example, braking. Thus, it prevents the driver from having his sight and motion interrupted.

Figure 3:
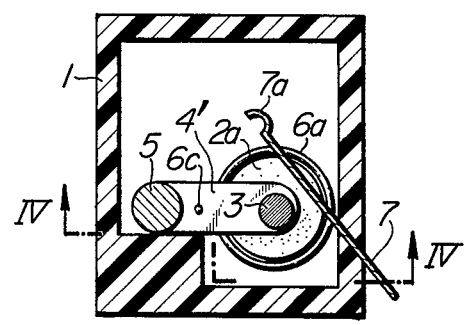

Although the invention has been described to have a pair of rotatable disks which act as the aforementioned rigid members, the disks 4, 4a of the first embodiment may be substituted by a pair of arms 4', 4a', as shown in a second embodiment in FIGS. 3 and 4, as well as in a third embodiment as shown in FIGS. 5 and 6. In these cases, these arms in combination carry the cylindrical massive weight 5.

The movable contact which is constituted by the straight portion of the coiled spring 6 may alternatively be constituted by the massive weight 5 itself, the massive weight 5 being connected to the end of the coiled spring 6, as is the case of the third embodiment of FIGS. 5 and 6.

It is also possible to substitute a pair of projections 3' unitarily formed on the arms 4', 4a', respectively, for the shaft allowing the rotation of the arms 4', 4a'.

Much enhanced reliability is obtained when two devices according to the present invention are combined to form a dual collision detecting apparatus, as shown in FIG. 6.

It is to be noted that, due to the arrangement of a pair of structures arranged symmetrically with the center line between the pair of rotatable rigid members supported by a case, and due to the stationary contact disposed between the rigid members, the apparatus according to the invention is much reduced in size as compared with conventional apparatus having symmetrically arranged two stationary contacts. The symmetrical arrangement also provides an equally ensured operation of the apparatus upon collisions occurring at either of both sides of the symmetrical line of the vehicle.

In addition, an enhanced stability in the generation of the collision signal is obtained, avoiding erroneous operation, since the contacts are closed by the rotation of rigid members exceeding a predetermined angle of rotation.

Although some embodiments have been described with specific terms, it is possible to modify them without departing from the scope of the invention which is limited solely by the appended claims.

What is claimed is:

1. A collision detecting apparatus for motor vehicle comprising:
   a casing made of non-conductive material;
   a shaft disposed in said casing:
   supporting means, fixed to said casing, for rotatably supporting said shaft;
   a pair of plate members, each being fixed to said shaft and spaced at a predetermined distance from each other;
   massive weight means fixed to said pair of plate members at a position apart from said shaft for rotating said pair of plate members;
   a conductive stationary contact fixed to said casing and extending through the space defined between said pair of plate members;
   conductive movable contact means coupled to said pair of plate members for making contact with said stationary contact upon sufficient rotation of of said pair of plate members; and
   biasing means secured to said housing and to said pair of plate members, for biasing said movable contact means to a position apart from said stationary contact.

2. A collision detecting apparatus as claimed in claim 1, wherein said plate members consist of a pair of disk plates, and said biasing means including a coiled spring having a straight portion between said disk plates, said straight portion serving as said movable contact means.

3. A collision detecting apparatus as claimed in claim 1, wherein said massive weight means is made of a conductive material further providing said movable contact means.

4. A collision detecting apparatus as claimed in claim 1, wherein said pair of plate members consist of elongated plates which are fixed to said shaft at one end portion thereof and coupled with said massive weight means at the other end portion thereof.

* * * * *